(12) United States Patent
Kobayashi et al.

(10) Patent No.: US 11,979,039 B2
(45) Date of Patent: May 7, 2024

(54) CHARGING DEVICE HAVING TWO CHARGING MODES

(71) Applicant: Koki Holdings Co., Ltd., Tokyo (JP)

(72) Inventors: Akihiro Kobayashi, Ibaraki (JP); Yuji Kishima, Ibaraki (JP); Tetsuya Monzen, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 729 days.

(21) Appl. No.: 16/973,420

(22) PCT Filed: Jun. 28, 2019

(86) PCT No.: PCT/JP2019/025897
§ 371 (c)(1),
(2) Date: Dec. 8, 2020

(87) PCT Pub. No.: WO2020/026664
PCT Pub. Date: Feb. 6, 2020

(65) Prior Publication Data
US 2021/0249871 A1    Aug. 12, 2021

(30) Foreign Application Priority Data

Jul. 30, 2018  (JP) .................. 2018-143010
Apr. 5, 2019   (JP) .................. 2019-073087

(51) Int. Cl.
*H01M 10/46*    (2006.01)
*H01M 10/42*    (2006.01)
(Continued)

(52) U.S. Cl.
CPC ......... *H02J 7/0013* (2013.01); *H01M 10/425* (2013.01); *H01M 10/441* (2013.01);
(Continued)

(58) Field of Classification Search
CPC ............... H02J 7/0013; H02J 7/007182; H02J 7/00309; H02J 7/02; H01M 10/441;
(Continued)

(56) References Cited

U.S. PATENT DOCUMENTS

2009/0121687 A1\* 5/2009 Kobayashi ............ H02J 7/0071
320/162

FOREIGN PATENT DOCUMENTS

CN   102480142   5/2012
CN   104247198   12/2014
(Continued)

OTHER PUBLICATIONS

"Office Action of Japan Counterpart Application" with English translation thereof, dated Jan. 11, 2022, p. 1-p. 8.
"Office Action of Japan Counterpart Application" with English translation thereof, dated Oct. 4, 2022, p. 1-p. 8.
(Continued)

*Primary Examiner* — Edward Tso
(74) *Attorney, Agent, or Firm* — JCIPRNET

(57) ABSTRACT

Provided is a charging device including a plurality of battery pack connection parts, the charging device capable of performing appropriate charging when charging is performed while switching a charging target battery pack. A microcomputer 90 can alternatively execute a first mode and a second mode as a control mode when the battery pack is connected to a plurality of the battery pack connection parts 6a to 6d. In the first mode, the charging target battery packs are switched before being fully charged and sequentially charged. In the second mode, the charging target battery packs are fully charged and then switched and charged. At each switching, the type or the state of the charging target battery pack is detected.

10 Claims, 11 Drawing Sheets

(51) Int. Cl.
  *H01M 10/44* (2006.01)
  *H01M 10/48* (2006.01)
  *H02J 7/00* (2006.01)
  *H02J 7/02* (2016.01)

(52) U.S. Cl.
  CPC ......... *H01M 10/443* (2013.01); *H01M 10/46* (2013.01); *H01M 10/48* (2013.01); *H01M 10/482* (2013.01); *H01M 10/486* (2013.01); *H02J 7/02* (2013.01); *H01M 2010/4271* (2013.01)

(58) Field of Classification Search
  CPC .. H01M 10/425; H01M 10/443; H01M 10/46; H01M 10/486; H01M 10/482; H01M 2010/4271; H01M 10/48
  USPC ....... 320/116, 122, 124, 132, 134, 136, 150, 320/162, 119
  See application file for complete search history.

(56) References Cited

FOREIGN PATENT DOCUMENTS

| | | |
|---|---|---|
| JP | H0424759 | 6/1992 |
| JP | H07130399 | 5/1995 |
| JP | H07153498 | 6/1995 |
| JP | H07326388 | 12/1995 |
| JP | H09215217 | 8/1997 |
| JP | 2003235172 | 8/2003 |
| JP | 2010119244 | 5/2010 |
| JP | 2011155755 | 8/2011 |
| JP | 2017112802 | 6/2017 |

OTHER PUBLICATIONS

"International Search Report (Form PCT/ISA/210) of PCT/JP2019/025897," dated Aug. 27, 2019, with English translation thereof, pp. 1-4.

"Office Action of China Counterpart Application", dated Dec. 19, 2023, with English translation thereof, pp. 1-13.

* cited by examiner

|  | Normal mode | Simultaneous charge mode |
|---|---|---|
| Charging order | Ascending order of numbers<br>Order of port 1 ⇒ 2 ⇒ 3 ⇒ 4 | • Charging starting from battery having low voltage<br>• Switching as shown in figure |
| At high temperature standby | • Skipping battery of high temperature standby, and charging battery of next number<br>• When high temperature standby ends, battery attachment_ standby<br>• When battery currently being charged finishes charging, charging in ascending order of numbers | Charging starting from battery having low voltage ① |
| When battery is removed in the middle | When battery currently being charged finishes charging, charging in ascending order of numbers | Charging starting from battery having low voltage ① |
| When battery is inserted in the middle | When battery currently being charged finishes charging, charging in ascending order of numbers | Charging starting from battery having low voltage ① |

FIG. 14

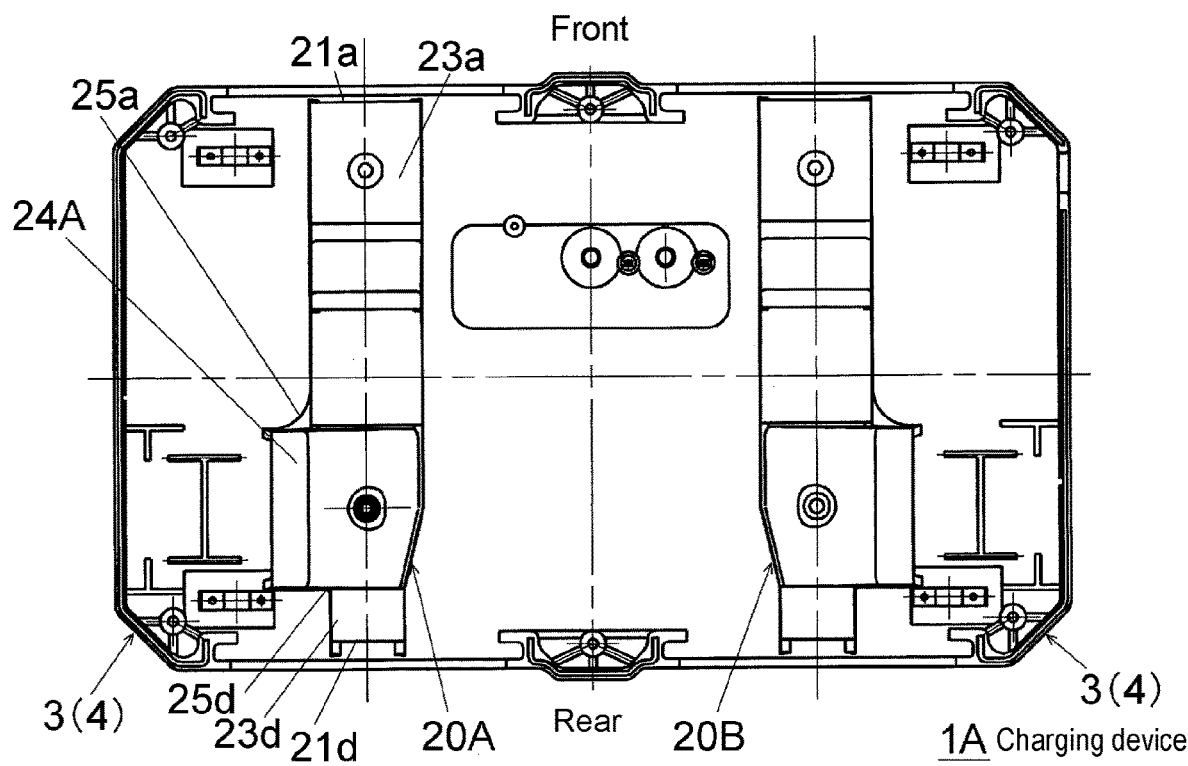

FIG. 15

CHARGING DEVICE HAVING TWO CHARGING MODES

CROSS-REFERENCE TO RELATED APPLICATION

This application is a 371 application of international application of PCT application serial no. PCT/JP2019/025897, filed on Jun. 28, 2019, which claims the priority benefit of Japan application no. 2018-143010, filed on Jul. 30, 2018 and Japan application no. 2019-073087, filed on Apr. 5, 2019. The entirety of each of the above-mentioned patent applications is hereby incorporated by reference herein and made a part of this specification.

BACKGROUND

Technical Field

The disclosure relates to a charging device including a plurality of battery pack connection parts.

Related Art

In Patent Document 1 below, in a charging device to which four battery packs can be simultaneously connected, it is possible to select among a plurality of charge modes. In mode 1, the battery pack supplied with the charging current is switched every 2.5 hours to perform charging. In mode 2, the battery pack supplied with the charging current is switched every 1 hour to perform charging. In mode 3, the battery pack supplied with the charging current is switched every 0.5 hours to perform charging. The battery pack has a charge amount of 100% after 2.5 hours of charge, a charge amount of about 80% after 1 hour of charge, and a charge amount of about 60% after 0.5 hours of charge. The switching of the battery pack supplied with the charging current may be based on the charge amount.

RELATED ART DOCUMENTS

Patent Documents

Patent Document 1: Japanese Patent Application Laid-open No. 9-215217

SUMMARY

Problems to be Solved

While Patent Document 1 shows the operation of a charging device in the case where the rated voltages of a plurality of battery packs are common to each other and the charge amount is commonly 0%, there is no disclosure about the case where the rated voltages and the charge amounts of the plurality of battery packs are different from each other.

The disclosure has been made in recognition of such a situation and its objective is to provide a charging device capable of performing appropriate charging in the case of charging and meanwhile switching a charging target battery pack in a charging device including a plurality of battery pack connection parts.

Means for Solving the Problems

One aspect of the disclosure is a charging device. The charging device includes a plurality of battery pack connection parts, a charging circuit, a selection means, and a control part. The charging circuit charges each of battery packs connected to each of the battery pack connection parts. The selection means selects a battery pack connection part to be a charging current supply destination from the charging circuit. The control part controls the charging circuit and the selection means. The control part is capable of alternatively executing a first mode and a second mode as a control mode when the battery packs are connected to the plurality of battery pack connection parts. In the first mode, a charging target battery pack, before being fully charged, is switched while the battery packs are sequentially charged, and in the second mode, the charging target battery pack, after being fully charged, is switched to charge the battery packs. The control part detects a type or a state of the charging target battery pack upon each switching.

The plurality of battery pack connection parts may include a first battery pack connection part to which a first battery pack is connected, and a second battery pack connection part to which a second battery pack is connected. In the first mode, a charging battery pack may be switched while the battery packs are sequentially charged in the following manner: charging of the first battery pack is started, and before the first battery pack is fully charged, charging of the first battery pack is stopped and charging of the second battery pack is started.

In the first mode, in a case where a plurality of battery packs having different remaining capacities are charged, the control part may switch the charging target battery pack without charging it when the remaining capacity of the charging target battery pack is higher than the remaining capacity of at least one other battery pack.

In the first mode, the control part may derive a remaining capacity of each of the battery packs based on a relationship between a current output voltage of each of the battery packs and an output voltage when fully charged, and may increase the remaining capacity stepwise while uniforming the remaining capacities of a plurality of battery packs.

The control part may switch the charging target battery pack without charging it when detecting an abnormality of the charging target battery pack.

In the second mode, the charging battery pack may be switched in the following manner: charging of the first battery pack is started, and after the first battery pack is fully charged, charging of the second battery pack is started.

A mode switch part for manually switching the control mode of the control part between the first mode and the second mode may be further provided.

In the first mode or the second mode, when the first battery pack has a high temperature, the control part may start charging of the second battery pack without charging the first battery pack.

When a high temperature state of the first battery pack is lifted, the control part may start charging of the first battery pack after charging of the second battery pack.

It is noted that any combination of the above constituent elements and conversion of the expression of the disclosure between a method and a system are also effective as an aspect of the disclosure.

Effects

According to the disclosure, it is possible to provide a charging device capable of performing appropriate charging in the case of charging and meanwhile switching a charging target battery pack in a charging device including a plurality of battery pack connection parts.

BRIEF DESCRIPTION OF THE DRAWINGS

FIG. 14 is a diagram describing the switching condition of the charging target battery pack in each of the first and second modes of the charging device 1.

FIG. 15 is a bottom sectional view of a charging device 1A according to Embodiment 2 of the disclosure.

DESCRIPTION OF THE EMBODIMENTS

Figure 1:
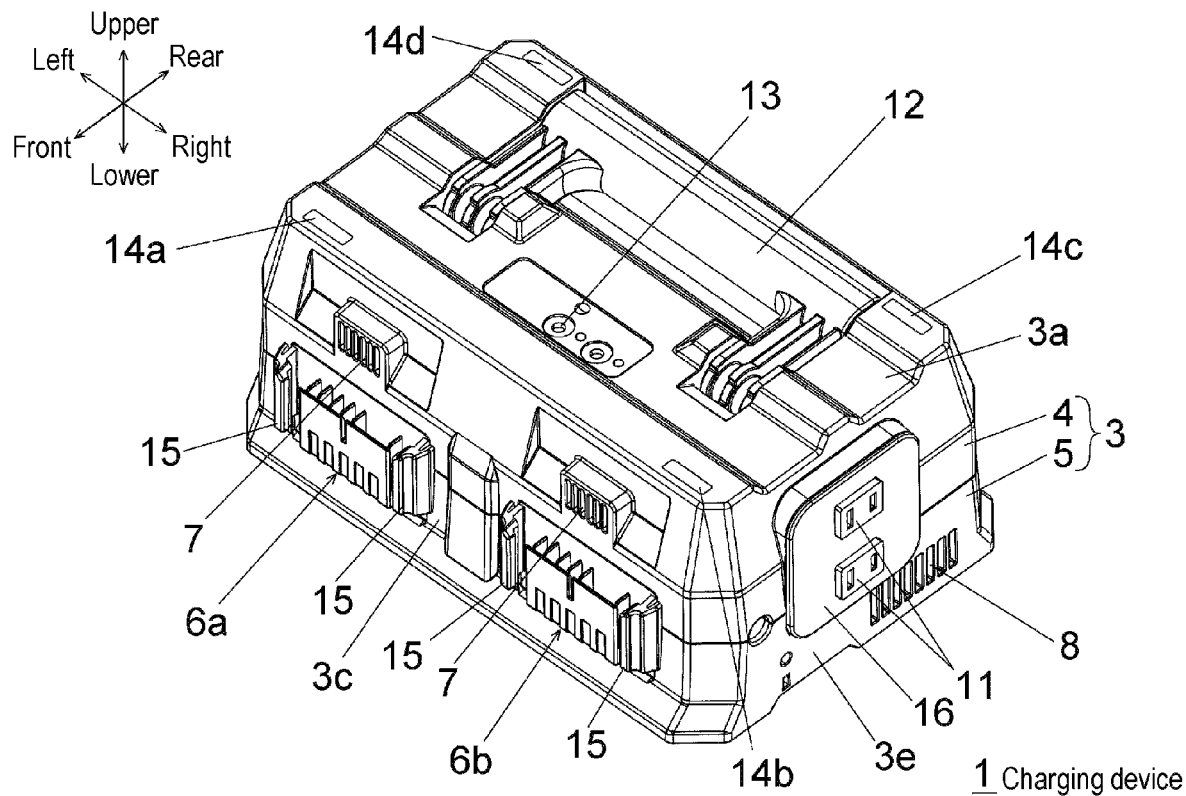
FIG. 1 is a perspective view of a charging device 1 according to Embodiment 1 of the disclosure.

Hereinafter, preferred embodiments of the disclosure will be described in detail with reference to the drawings. The same or equivalent constituent elements, members, and the like shown in the drawings will be labeled with the same reference numerals, and repeated descriptions will be omitted as appropriate. In addition, the embodiments do not limit the disclosure and are examples, and features and combinations thereof described in the embodiments are not necessarily all essential to the disclosure.

Embodiment 1

Referring to FIG. 1 to FIG. 14, a charging device 1 according to Embodiment 1 of the disclosure will be described. Referring to FIG. 1, the front, rear, upper, lower, left, and right directions of the charging device 1 are defined. A case (housing) 3 forming an outer frame in a substantially rectangular parallelepiped shape of the charging device 1 is a combination of an upper case 4 and a lower case 5. The upper case 4 and the lower case 5 are, for example, resin molded bodies.

The case 3 includes an upper part 3a, a lower part 3b (FIG. 6 and FIG. 7), and side parts 3c to 3f. The lower part 3b is opposite to the upper part 3a. The side parts 3c to 3f connect the upper part 3a and the lower part 3b to each other. The side part 3c is the front part of the case 3 and corresponds to a first side part. The side part 3d is the rear part of the case 3 and corresponds to a second side part. The side part 3e is the right side part of the case 3. The side part 3f is the left side part of the case 3 and corresponds to a third side part. The side parts 3c and 3d are opposite to each other. The side parts 3e and 3f are opposite to each other. The lengths of the side parts 3c and 3d in the left-right direction are greater than the lengths of the side parts 3e and 3f in the front-rear direction.

A handle 12 is rotatably supported by the upper part 3a of the case 3. State display parts 14a to 14d are respectively provided at four corner parts of the upper part 3a of the case 3. The state display parts 14a to 14d include light-emitting elements such as LEDs (light-emitting diodes). Through their own lighting state, the state display parts 14a to 14d notify the operator of the charging status or the like of battery packs connected to battery pack connection parts 6a to 6d. A charge mode switch 13 serving as a mode switch part is provided at the center of the front part of the upper part 3a.

Figure 5:
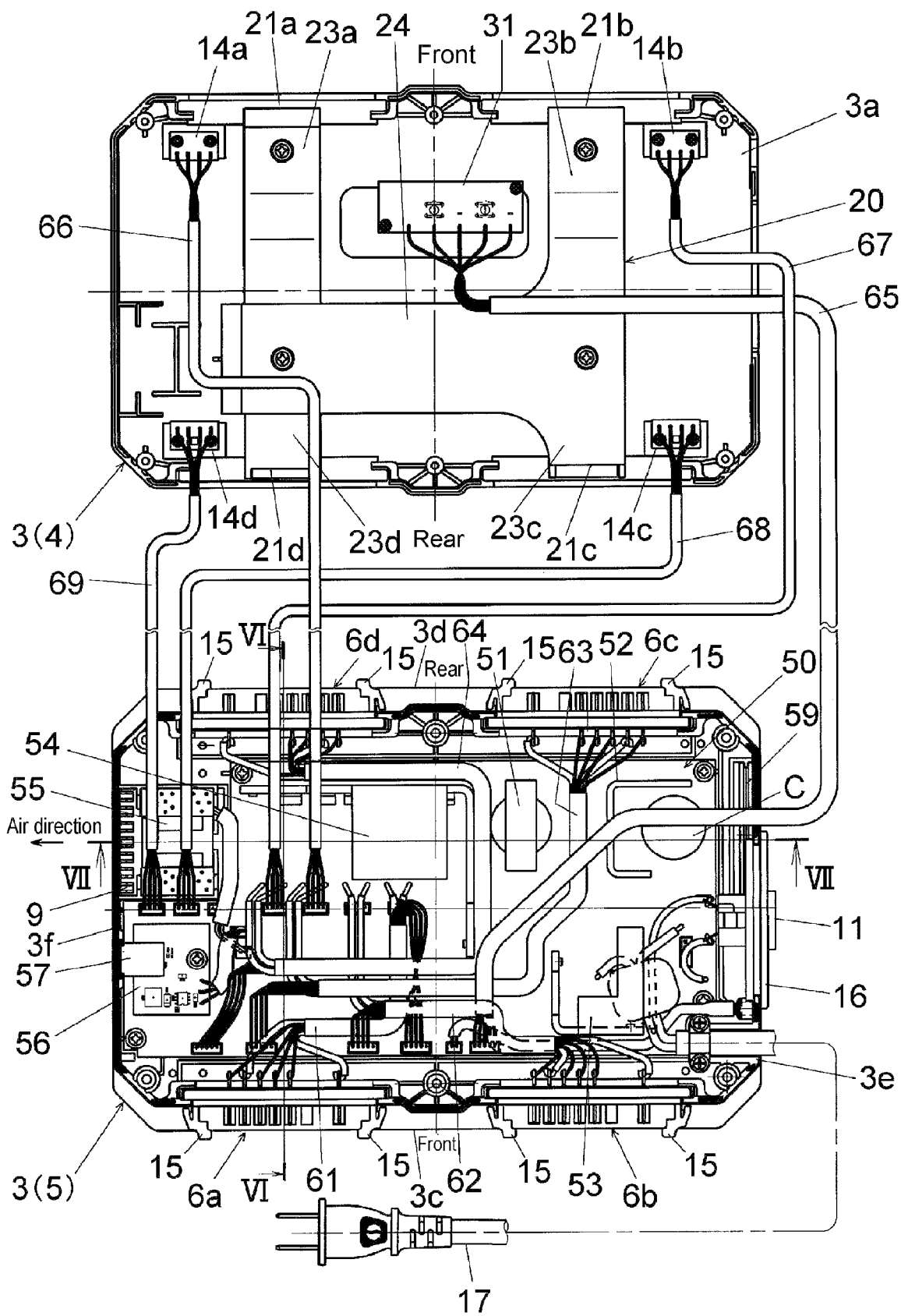
FIG. 5 is a view showing an internal structure of the charging device 1.

The battery pack connection parts 6a and 6b are provided on the side part 3c, which is the front part of the case 3. As shown in FIG. 5, the battery pack connection parts 6c and 6d are provided on the side part 3d, which is the rear part of the case 3. The battery pack connection parts 6a to 6d each have a vent (intake port) 7 and a pair of rail parts 15. The intake port 7 communicates with an exhaust port of battery packs connected to the battery pack connection parts 6a to 6d. The rail parts 15 extend in the upper-lower direction. The rail parts 15 serve as a guide when the battery pack is attached to the battery pack connection parts 6a to 6d. In the present embodiment, while the vent 7 provided in the battery pack connection parts 6a to 6d will be described as an intake port and the vent of the battery pack will be described as an exhaust port, the vent 7 may also be used as an exhaust port, and the vent of the battery pack may also be used as an intake port.

A vent (intake port) 8 and a plug outlet holder (outlet holder) 16 are provided on the side part 3e, which is the right side part of the case 3. The intake port 8 has a plurality of openings provided on the lower-rear side with respect to the center of the side part 3e. Two plug outlets (outlets) 11 are provided on the plug outlet holder 16. AC100V is outputted to the plug outlet 11. By inserting a power cord of an external electric device (not shown) into the plug outlet 11, power can be supplied from the charging device 1 to the external electric device. As shown in FIG. 5, a vent (exhaust port) 9 is provided on the side part 3f, which is the left side part of the case 3. The exhaust port 9 has a plurality of openings provided on the lower-rear side with respect to the center of the side part 3f. In the present embodiment, while the vent 8 will be described as an intake port and the vent 9 will be described as an exhaust port, the vent 8 may also be used as an exhaust port and the vent 9 may also be used as an intake port.

Figure 7:
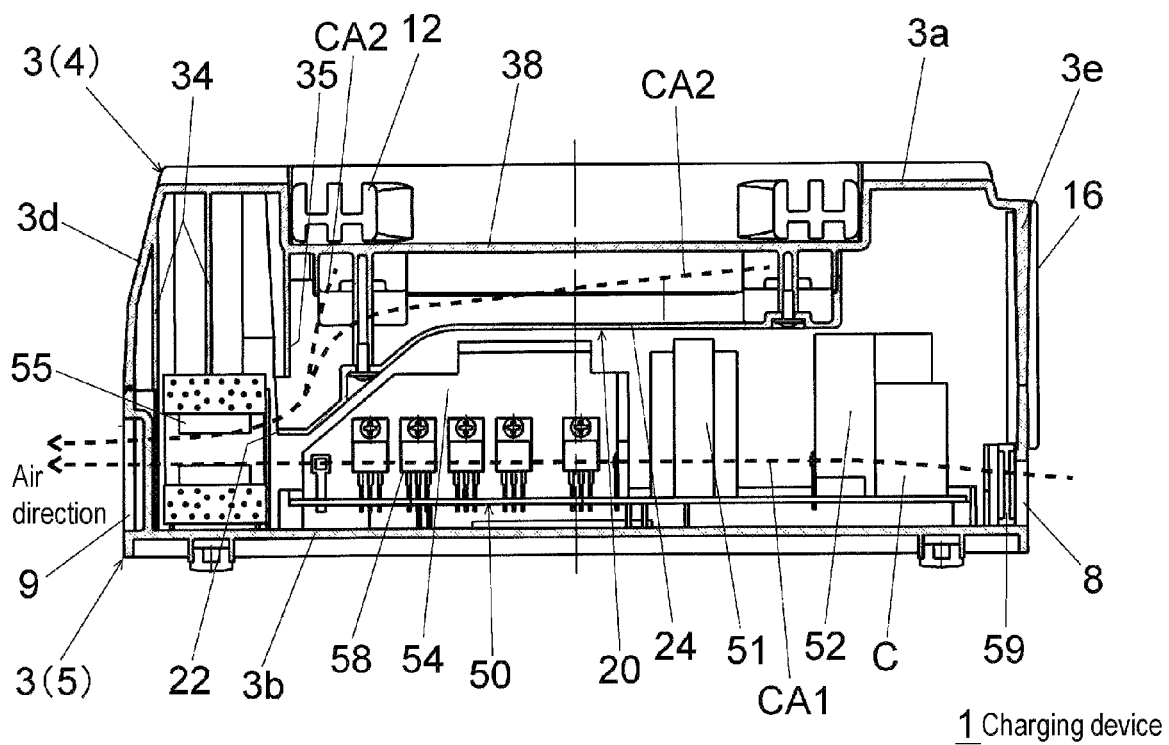
FIG. 7 is a VII-VII sectional view of FIG. 5.
Figure 8:
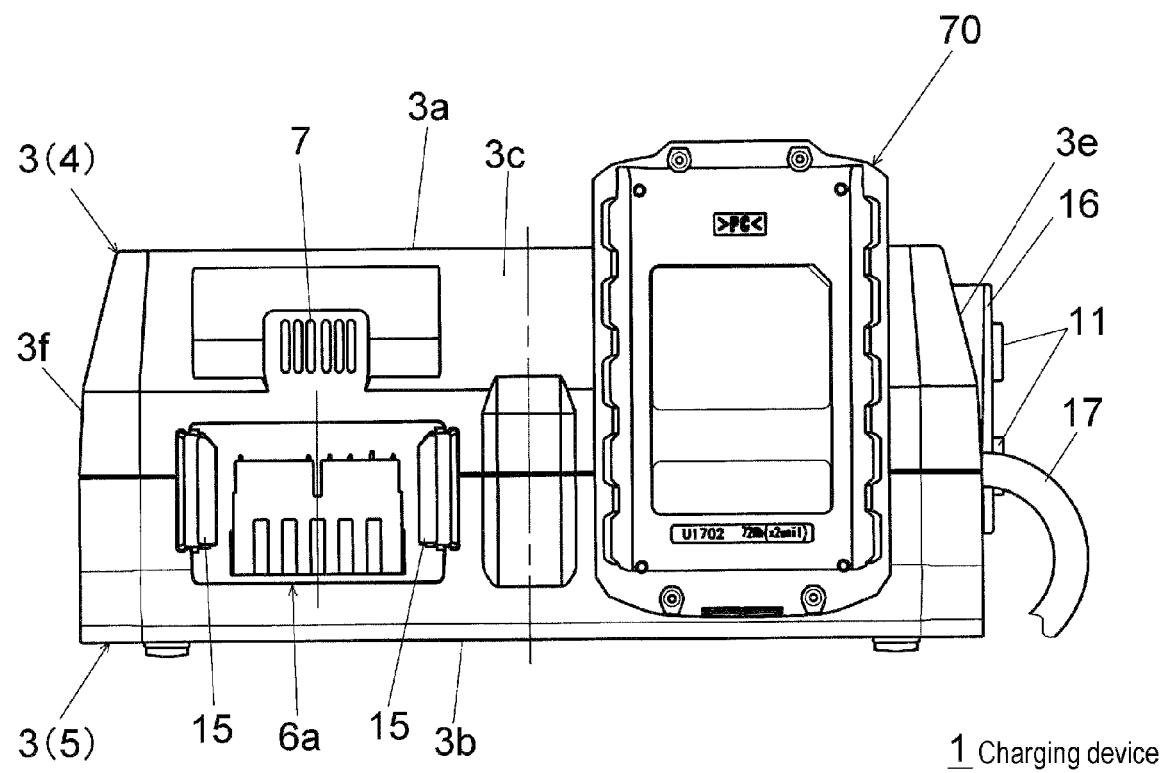
FIG. 8 is a front view of the charging device 1 attached with one battery pack 70.

As shown in FIG. 5 and FIG. 7, the case 3 accommodates a main board 50 and a fan 55. The main board 50 is fixed to the lower surface of the lower case 5 by screwing or the like. The main board 50 is mounted with components which form a charging circuit part. The fan 55 is held in the vicinity of the exhaust port 9. The fan 55 is located on the rear side with respect to the center of the case 3 in the front-rear direction, i.e., the center between the side parts 3c and 3d. The fan 55 is an axial fan which sucks the air in the case 3 and exhausts the air to the outside from the exhaust port 9. The fan 55 is a single fan which generates a cooling air for cooling a plurality of battery packs connected to the battery pack connection parts 6a to 6d and the charging circuit part provided on the main board 50.

A transformer 51, heat dissipation fins 52 to 54, a USB (Universal Serial Bus) board 56, a capacitor C, and a plurality of FETs 58 serving as switching elements are provided on the main board 50. A USB connector 57 is provided on the USB board 56. The USB connector 57 is opened on the left side surface (the side part 3f) of the lower case 5. A power cord 17 is drawn from the front part of the right side surface (the side part 3e) of the case 3 and is connected to an external AC power supply such as a commercial power supply. As shown in FIG. 5 and FIG. 7, an air filter 59 is provided in the case 3 and covers the intake port 8. The air filter 59 suppresses entrance of dust and the like into the case 3 from the outside of the case 3.

Wirings 61 to 64 electrically connect the battery pack connection parts 6a to 6d and the main board 50 to each other. A wiring 65 electrically connects a switch board 31 fixed to the upper case 4 by screwing or the like and the main board 50 to each other. Wirings 66 to 69 electrically connect the state display parts 14a to 14d and the main board 50 to each other. The switch board 31 is mounted with a charge mode switch 13 shown in FIG. 1 and other figures.

Figure 2:
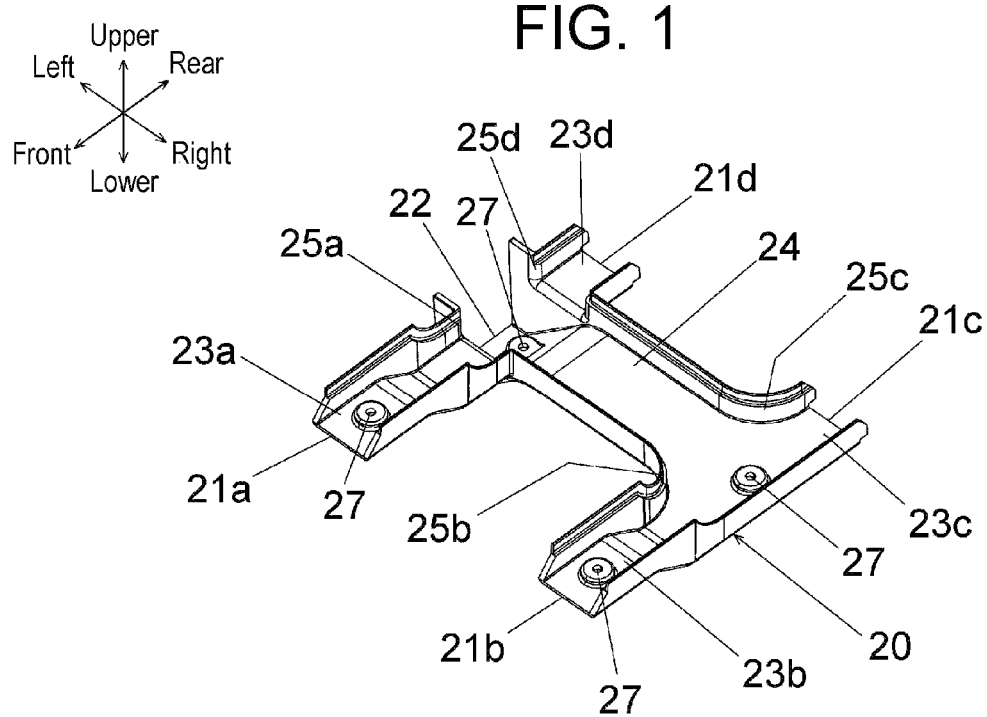
FIG. 2 is a perspective view of a duct 20 of the charging device 1.
Figure 3:
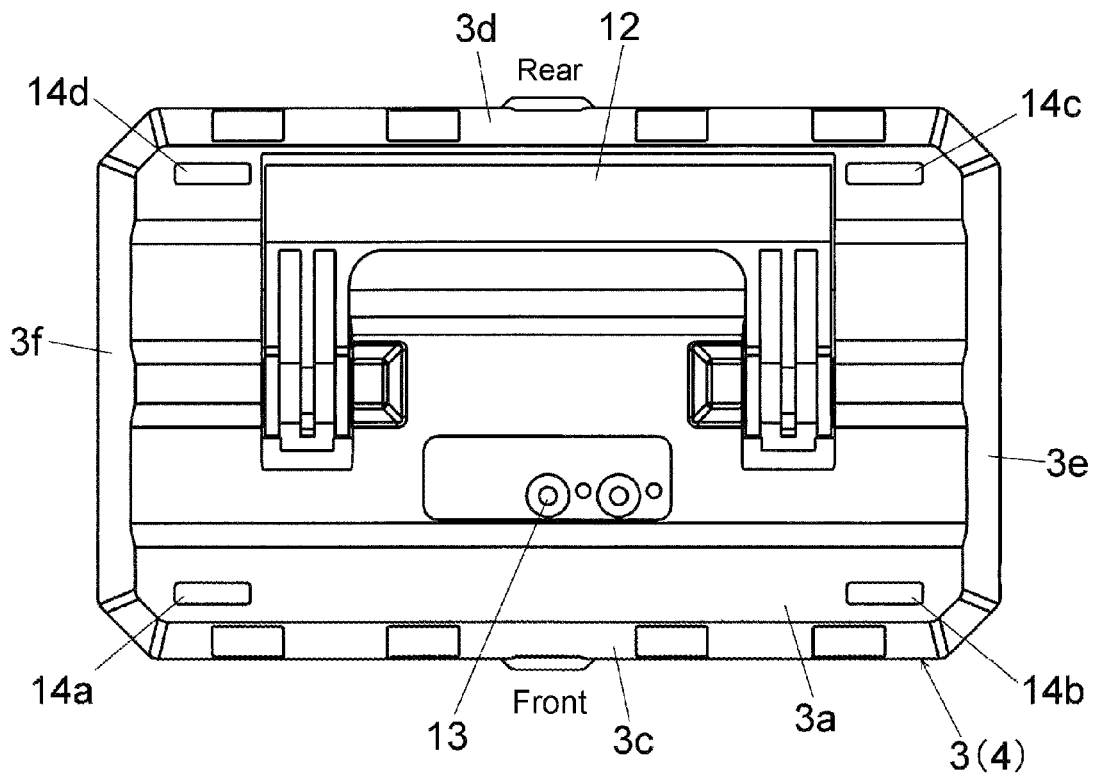
FIG. 3 is a plan view of an upper case 4 of the charging device 1.

A duct 20 is a guide part which forms an air passage between the fan 55 and the intake ports 7 of the battery pack connection parts 6a to 6d. The duct 20 is, for example, a resin molded body and is made of a single member. As shown in FIG. 2, the duct 20 includes first air passage end parts 21a to 21d, a second air passage end part 22, first linking parts 23a to 23d, and a second linking part 24. The first air passage end parts 21a to 21d respectively face (are close to) the intake ports 7 of the battery pack connection parts 6a to 6d. The second air passage end part 22 faces (is close to) the fan 55.

The first linking parts 23a and 23d extend substantially parallel to the front-rear direction and connect between the first air passage end parts 21a and 21d. The first linking parts 23b and 23c extend substantially parallel to the front-rear direction and connect between the first air passage end parts 21b and 21c. The second linking part 24 extends substantially parallel to the left-right direction and connects a merging part of the first linking parts 23b and 23c, a merging part of the first linking parts 23a and 23d, and the second air passage end part 22. The second linking part 24 is located on the rear side with respect to the center between the side parts 3c and 3d. The first linking part 23a is longer than the first linking part 23d. The first linking part 23b is longer than the first linking part 23c.

The first linking parts 23a and 23d are located closer to the fan 55 than the first linking parts 23b and 23c, i.e., on the left side. A connection part 25a between the first linking part 23a and the second linking part 24 and a connection part 25d between the first linking part 23d and the second linking part 24 have relatively large curvatures. A connection part 25b between the first linking part 23b and the second linking part 24 and a connection part 25c between the first linking part 23c and the second linking part 24 have relatively small curvatures (the curvatures are smaller than those of the connection parts 25a and 25d). Therefore, the duct 20 is formed in a shape in which, compared to the portion close to the fan 55, the flow path resistance is smaller and the cooling air generated by the fan 55 flows easily in the portion far from the fan 55, so that the amount of cooling air passing through the intake ports 7 of the battery pack connection parts 6a to 6d becomes nearly uniform.

As shown in FIG. 7, in the upper-lower direction, the lower end part of the second air passage end part 22 is located within the range of the fan 55 and slightly above the center of the fan 55. Through the duct 20, the cooling air generated by the fan 55 is separated into a first cooling air CA1 flowing through the charging circuit part and a second cooling air CA2 passing through the battery pack connection parts 6a to 6d.

Figure 4:
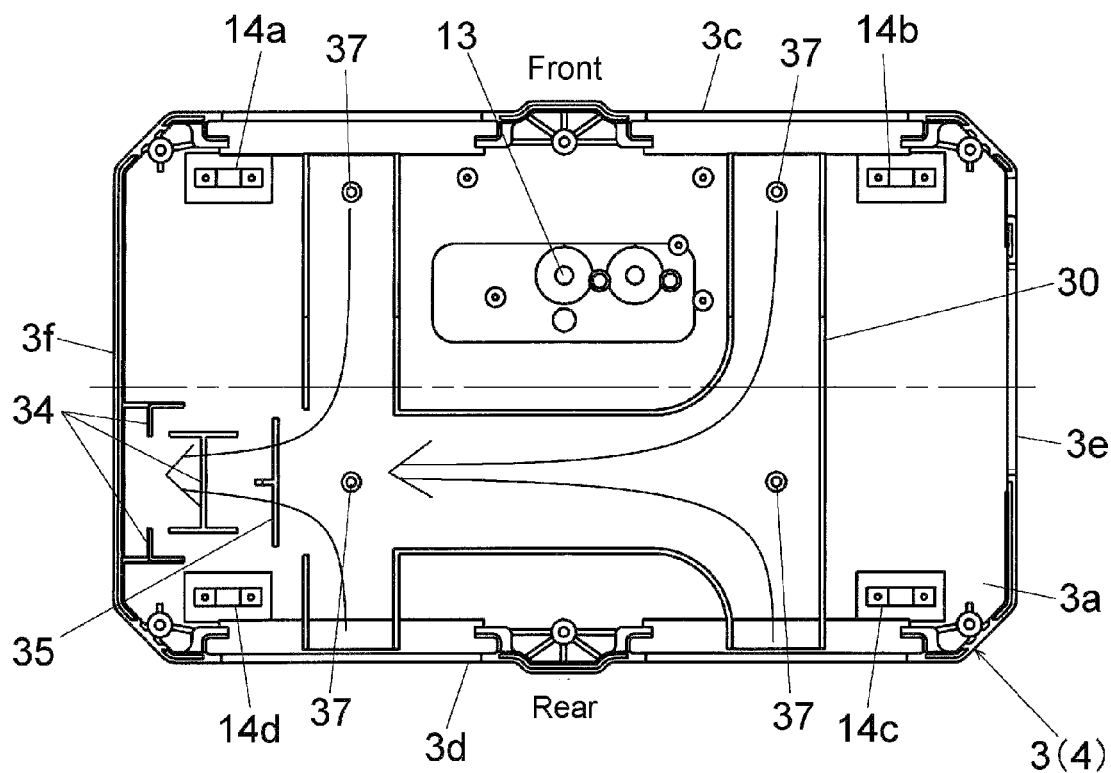
FIG. 4 is a bottom view of the upper case 4.

A predetermined number of through-holes 27 for screwing are provided on the lower surface of the duct 20. As shown in FIG. 4, a predetermined number of bosses 37 for screwing are provided on the lower surface of the upper case 4 at positions corresponding to the through-holes 27 of the duct 20. The duct 20 is fixed to the upper case 4 by screwing or the like. Ribs 30, 34, and 35 are provided on the lower surface of the upper case 4. The rib 30 is an air passage forming rib which is connected to the side part of the duct 20 and forms a part of the air passage. The rib 34 is provided to hold the fan 55 at a predetermined position. The rib 35 is provided above the second air passage end part 22 of the duct 20. The rib 35 guides the second cooling air CA2 so that the second cooling air CA2 is efficiently sucked by the fan 55.

Figure 6:
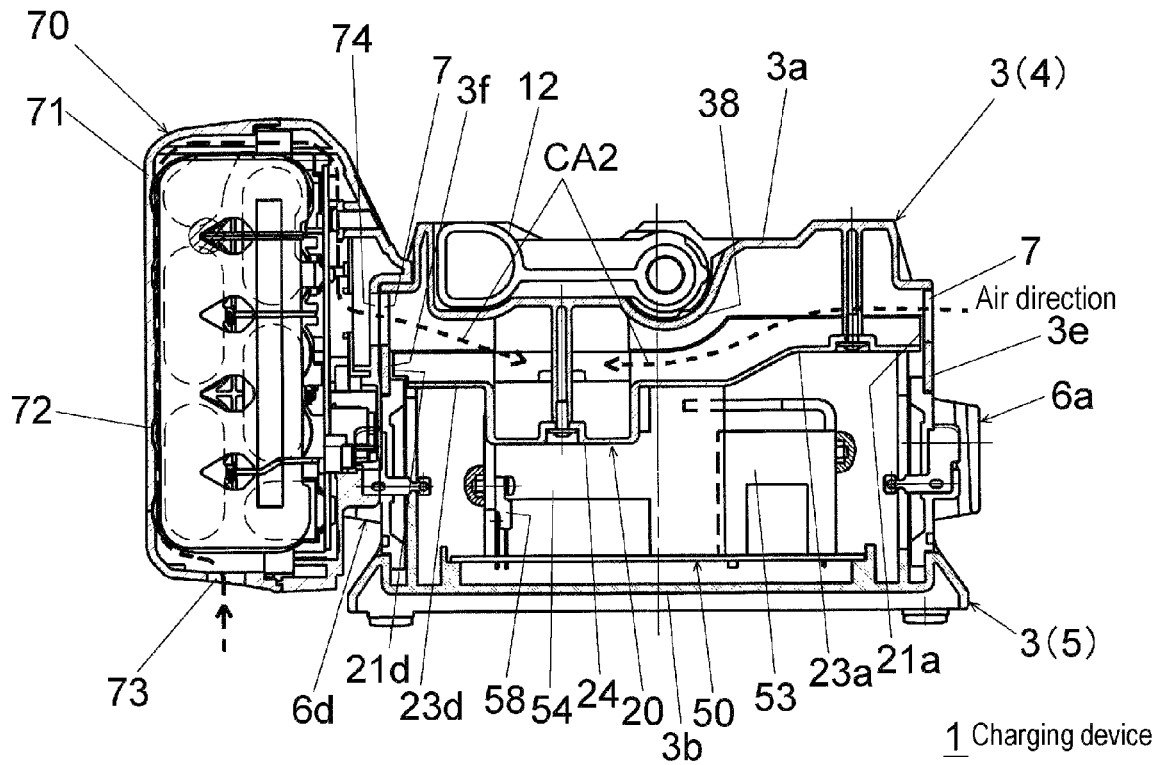
FIG. 6 is a VI-VI sectional view of FIG. 5 and is a sectional view of the charging device 1 in a state in which a battery pack 70 is attached to a battery pack connection part 6d.

As shown in FIG. 6, a recess 38 which accommodates the handle 12 is provided on the upper part 3a of the case 3. The recess 38 substantially ranges from the vicinity of the center of the case 3 to the rear side in the front-rear direction. The first linking part 23a of the duct 20 is at the position that the lower surface of the portion on the front side with respect to the recess 38 (not adjacent to the recess 38) and the first air passage end part 21a is located higher than the lower surface of the portion immediately below the recess 38 (close to the recess 38) and the lower surface of the first linking part 23d and the first air passage end part 21d. Similarly, the first linking part 23b is at the position that the lower surface of the portion on the front side with respect to the recess 38 and the first air passage end part 21b is located higher than the lower surface of the portion immediately below the recess 38 and the lower surface of the first linking part 23c and the first air passage end part 21c. This is intended to suppress the difference in the flowability of the cooling air due to the presence of the recess 38.

As shown in FIG. 6, a battery pack 70 includes a battery case 71 and a secondary battery cell 72. A plurality of secondary battery cells 72 are accommodated and held in the battery case 71. An intake port (vent) 73 and an exhaust port (vent) 74 are provided on the battery case 71. The exhaust port 74 communicates with the intake port 7 of the charging device 1. By being attached to any of the battery pack connection parts 6a to 6d, the battery pack 70 is fixed to the charging device 1 and an electrical connection (contact between terminals) with the charging device 1 is established, so that the battery pack 70 can be charged by the charging device 1. Since the intake port (vent) 73 faces downward, it is possible to suppress entrance of dust and the like into the battery case 71.

The flow of the cooling air generated when the fan 55 is driven will be described. As shown in FIG. 7, the first cooling air CA1 is taken into the case 3 via the intake port 8 and the air filter 59 of the case 3, cools the components on the main board 50, is sucked into the fan 55, and is discharged to the outside of the case 3 from the exhaust port 9. The second cooling air CA2, as shown in FIG. 6, is taken into the battery pack 70 from the intake port 73 of each battery pack 70 connected to the battery pack connection parts 6a to 6d, cools the components in the battery pack 70, is taken into the case 3 from each intake port 7 of the case 3, is guided by the duct 20, is sucked into the fan 55 as shown in FIG. 7, and is discharged to the outside of the case 3 from the exhaust port 9.

Figure 9:
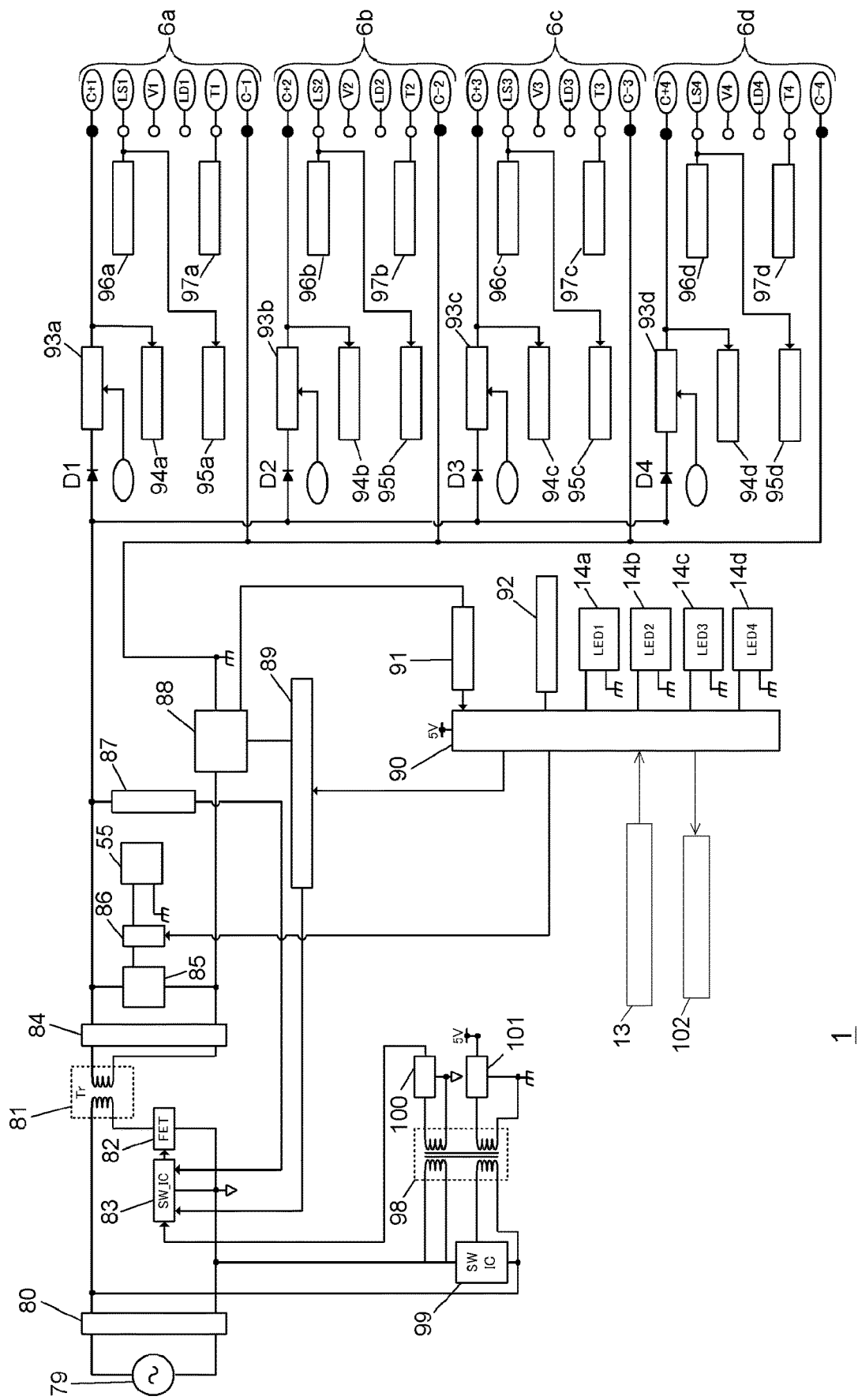
FIG. 9 is a circuit block diagram of the charging device 1.

FIG. 9 is a circuit block diagram of the charging device 1. In the charging device 1, a rectifier circuit 80 is, for example, a diode bridge and rectifies the current supplied from an AC power supply 79. A transformer 81 and a switching element 82 such as a FET are provided between the output terminals of the rectifier circuit 80. The turn-on/off of the switching element 82 is controlled by a switching control circuit 83. A rectifying and smoothing circuit 84 rectifies and smoothes the output current on the secondary side of the transformer 81. The transformer 81, the switching element 82, and the rectifying and smoothing circuit 84 form a charging circuit. A 12V power supply 85 converts the output voltage of the rectifying and smoothing circuit 84 into an operating voltage (e.g., DC 12V) of the fan 55. A fan control circuit 86 controls the driving of the fan 55.

A voltage feedback circuit 87 detects the output voltage of the rectifying and smoothing circuit 84 and feeds back to the switching control circuit 83. A shunt resistor 88 is provided in the path of the output current (charging current) from the rectifying and smoothing circuit 84 to the battery pack connection parts 6a to 6d. A current feedback circuit 89 detects the charging current according to the voltage across the shunt resistor 88 and feeds back to the switching control circuit 83. A current detection circuit 91 detects the charging current according to the voltage across the shunt resistor 88 and feeds back to a microcomputer 90. An overcharge detection circuit 92 detects whether a charging target battery pack is overcharged. A charge mode display LED 102 displays the current charge mode of the charging device 1 under the control of the microcomputer 90.

The microcomputer (microcontroller) 90 functions as a control part. The microcomputer 90 controls the switching control circuit 83 to control the output voltage and the output current of the rectifying and smoothing circuit 84 to be appropriate values according to the state and type of the charging target battery pack (the battery pack to which the charging current is currently supplied, among the battery packs connected to the battery pack connection parts 6a to 6d). The microcomputer 90 also controls the fan control circuit 86 to control the driving of the fan 55.

A transformer 98 and a switching control circuit 99 are provided between the output terminals of the rectifier circuit 80. Power supplies 100 and 101 are provided on the secondary side of the transformer 98. The power supply 100 supplies an operating voltage of the switching control circuit 83. The power supply 101 supplies an operating voltage (e.g., DC 5V) of the microcomputer 90. By using a photocoupler or the like for connection between the switching control circuit 83 and the voltage feedback circuit 87, the current feedback circuit 89, the microcomputer 90, and the power supply 100 and 101, insulation between the primary side and the secondary side of the transformers 81 and 98 can be secured.

A C+ terminal and a C-terminal provided in each of the battery pack connection parts 6a to 6d are terminals for supplying the charging current. An LS terminal is a terminal for receiving from the battery pack a temperature detection signal indicating the temperature of the battery pack. A T terminal is a terminal for receiving from the battery pack an identification signal indicating the type (rated voltage, etc.) of the battery pack. The battery pack connection part 6a corresponds to a port 1, the battery pack connection part 6b corresponds to a port 2, the battery pack connection part 6c corresponds to a port 3, and the battery pack connection part 6d corresponds to a port 4.

Diodes D1 to D4 are respectively provided in the current paths from the rectifying and smoothing circuit 84 to the battery pack connection parts 6a to 6d to prevent reverse flow of the current. Relays 93a to 93d serving as selection means are respectively provided in the current paths from the rectifying and smoothing circuit 84 to the battery pack connection parts 6a to 6d. Under the control of the microcomputer 90, the relays 93a to 93d are alternatively turned on depending on which of the battery packs connected to the battery pack connection parts 6a to 6d is the charging target battery pack. Voltage detection circuits 94a to 94d detect the voltages of the battery packs connected to the battery pack connection parts 6a to 6d and feed back to the microcomputer 90. Overvoltage detection circuits 95a to 95d detect whether the battery packs connected to the battery pack connection parts 6a to 6d have an overvoltage and feed back to the microcomputer 90. Temperature detection circuits 96a to 96d detect the temperatures of the battery packs connected to the battery pack connection parts 6a to 6d and feed back to the microcomputer 90. Battery pack identification circuits 97a to 97d detect the types of the battery packs connected to the battery pack connection parts 6a to 6d and feed back to the microcomputer 90. The microcomputer 90 detects the type (rated voltage, etc.) and the state (voltage or temperature) of the charging target battery pack each time the charging target battery pack is switched.

Figure 10:
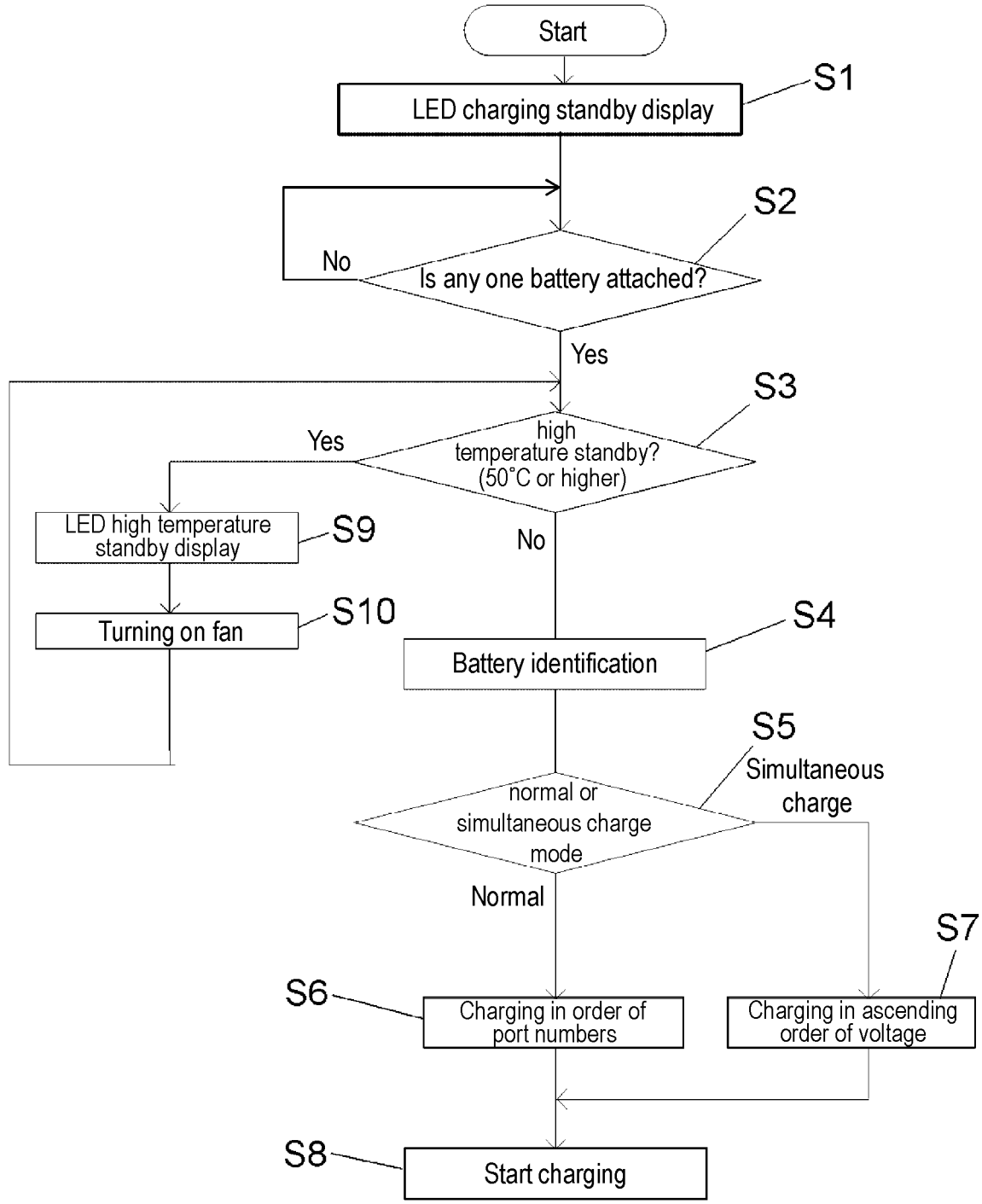
FIG. 10 is a flowchart of charge mode determination in the charging device 1.

FIG. 10 is a flowchart of charge mode determination in the charging device 1. The microcomputer 90 performs charging standby display on the state display parts 14a to 14d (S1). When a battery pack is connected to at least one of the battery pack connection parts 6a to 6d ("YES" in S2), the microcomputer 90 confirms the temperature of the connected battery pack, and if it is not higher than a predetermined temperature, e.g., 50° C. ("NO" in S3), the microcomputer 90 determines the type or the state of the battery pack (S4). This step S4 is performed each time the charging of the battery pack is started regardless of the charge mode to be described later. In other words, it is performed each time the charging battery pack is switched. Therefore, the microcomputer 90 can accurately learn the type or the state of the battery pack before charging, and can perform accurate charging according to the type or the state of the battery pack. When a normal mode serving as a second mode is selected as the charge mode of the battery pack ("normal" in S5), the microcomputer 90 determines to perform control of charging in the order of the port numbers (S6) and starts the charging (S8). When a simultaneous charge mode serving as a first mode is selected as the charge mode of the battery pack ("simultaneous charging" in S5), the microcomputer 90 determines to perform control of sequential charging in the ascending order of voltage (S7) and starts the charging (S8). In step S3, when the temperature of the battery pack is a predetermined temperature, e.g., 50° C., or higher ("YES" in S3), the microcomputer 90 performs high temperature standby display on the state display parts 14a to 14d corresponding to the one among the battery pack connection parts 6a to 6d to which the battery pack is connected (S9), and drives the fan 55 (S10). If one battery pack is connected, and if a high temperature is determined in step S3, steps S9 and S10 are performed until the high temperature state is lifted. On the other hand, in the state where a plurality of battery packs are connected, one battery pack may have a high temperature and the other battery packs may not have a high temperature. In that case, even if there is only one high temperature battery pack in step S3, charging cannot be started. Therefore, in step S3, the temperatures of all connected battery packs are detected, and if there is a battery pack that does not have a high temperature, proceeding to step S4, only the battery pack that does not have a high temperature may be charged, and after the high temperature state is lifted, the battery pack may be charged in the selected charge mode.

Figure 11:
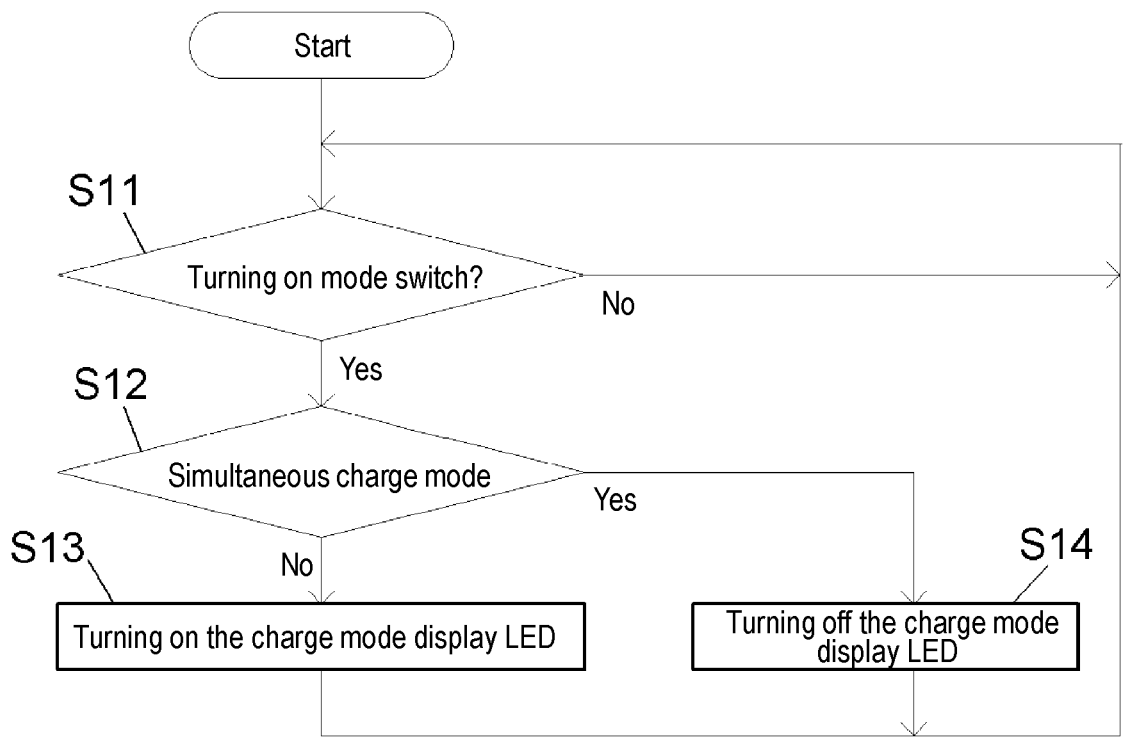
FIG. 11 is a flowchart of turning on a charge mode display LED 102 in the charging device 1.

FIG. 11 is a flowchart of turning on the charge mode display LED 102 in the charging device 1. When the charge mode switch 13 is pressed ("YES" in S11), the microcomputer 90 switches the charge mode between the first mode (simultaneous charge mode) and the second mode (normal mode), and if the mode after switching is not the simultaneous charge mode ("NO" in S12), the microcomputer 90 turns on the charge mode display LED 102 (S13). If the mode after switching is the simultaneous charge mode ("YES" in S12), the microcomputer 90 turns off the charge mode display LED 102 (S14).

Figure 12:
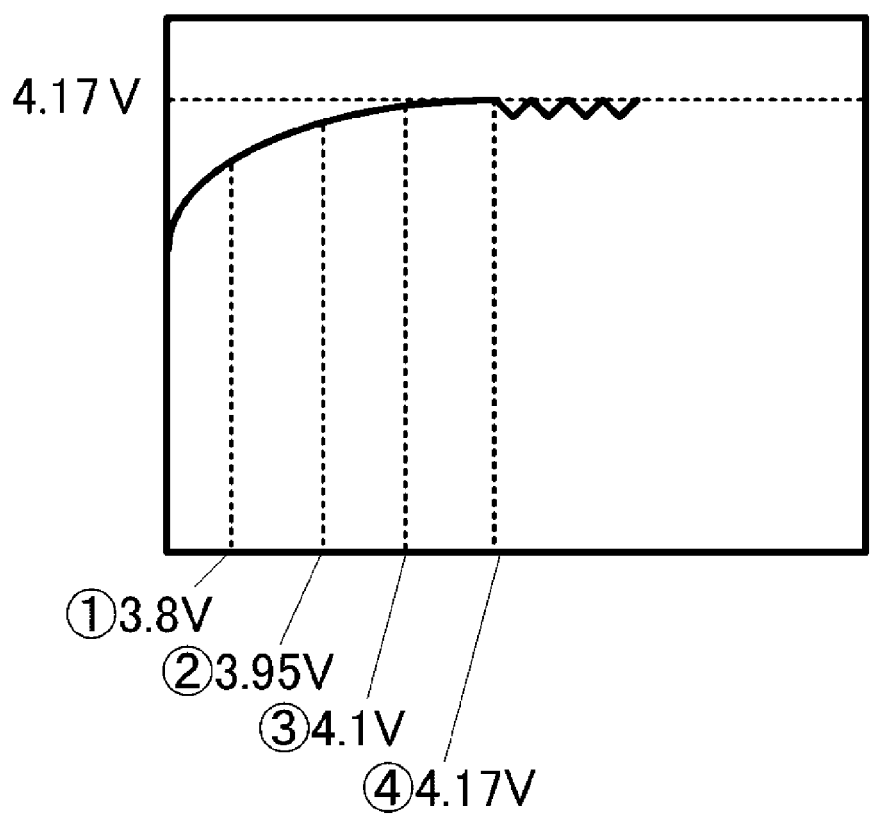
FIG. 12 is a graph showing an example of a voltage value of switching the charging target battery pack in the first mode of the charging device 1.

FIG. 12 is a graph showing an example of a voltage value of switching the charging target battery pack in the first mode (simultaneous charge mode) of the charging device 1. In the simultaneous charge mode, first, while switching the charging target battery pack, all the battery packs are charged to 3.8V per secondary battery cell. Afterwards, while switching the charging target battery pack, all the battery packs are charged to 3.95V per secondary battery cell. Similarly, all the battery packs are charged stepwise to 4.1V and 4.17V per secondary battery cell.

Figure 13:
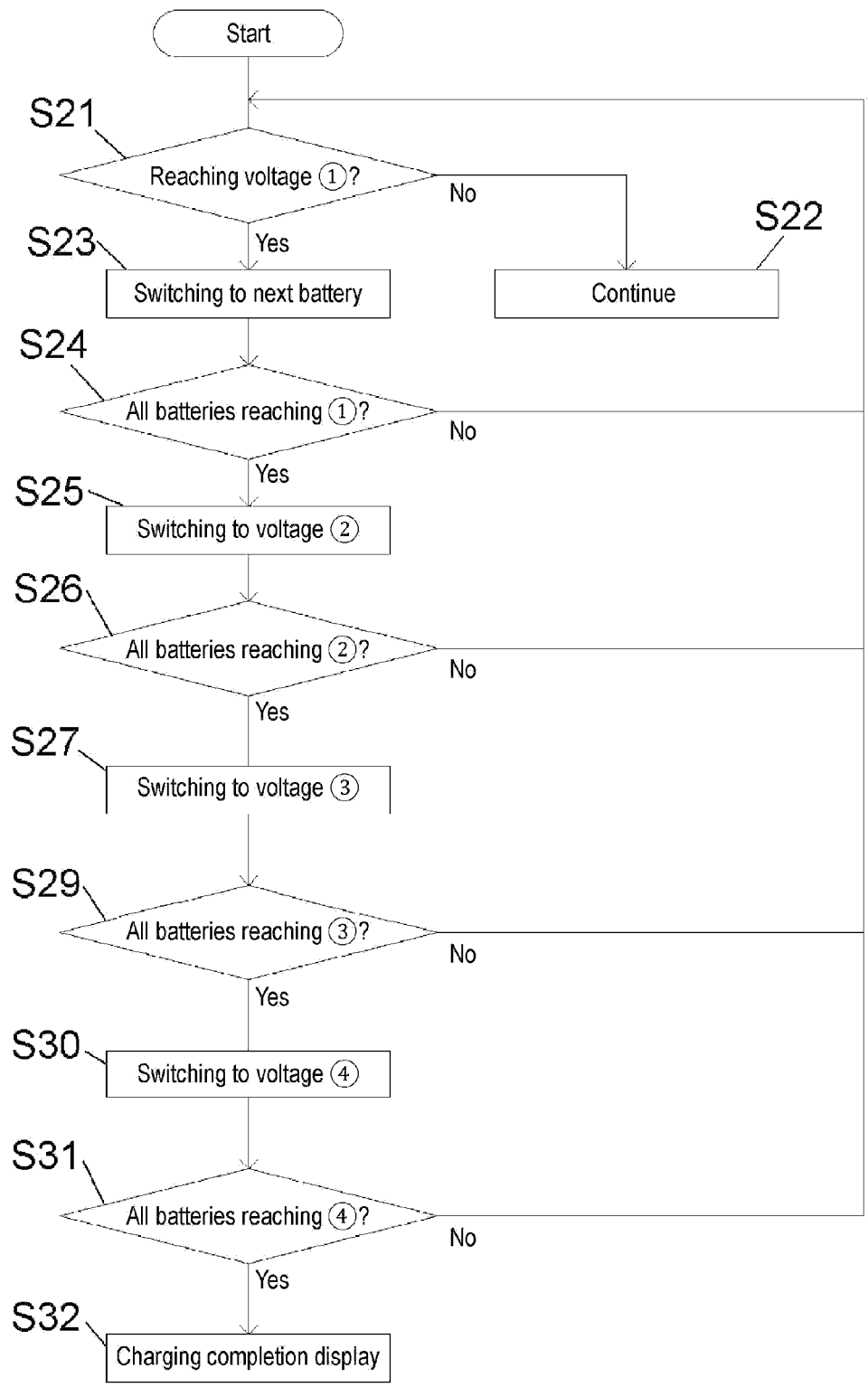
FIG. 13 is a flowchart showing the process of charging in the first mode of the charging device 1.

FIG. 13 is a flowchart showing the process of charging in the first mode of the charging device 1. The microcomputer 90 selects the battery pack having the lowest voltage (the battery pack having the lowest remaining capacity ratio (or remaining capacity)) as the charging target battery pack, and determines (detects) the type or the state of the battery pack. Next, a target voltage is set to 3.8V per secondary battery cell, and before the voltage of the charging target battery pack reaches 3.8V per secondary battery cell ("NO" in S21), the charging of the battery pack is continued (S22). When the voltage of the charging target battery pack reaches 3.8V per secondary battery cell ("YES" in S21), the microcomputer 90 switches the charging target battery pack to the battery pack having the lowest voltage among the remaining battery packs (S23). Upon each switch, the microcomputer 90 determines the type or the state of the battery pack before charging the battery pack. Therefore, the type or the state of the charging target battery pack can be accurately learned, and accurate charging can be performed according to the type or the state of the battery pack. The microcomputer 90 switches the charging target battery pack each time the voltage of the charging target battery pack reaches 3.8V per secondary battery cell, and when the voltage of all the battery packs reaches 3.8V per secondary battery cell ("YES" in S24), the microcomputer 90 switches the target voltage to 3.95V per secondary battery cell (S25). The microcomputer 90 performs charging while switching the charging target battery pack, and when the voltage of all the battery packs reaches 3.95V per secondary battery cell ("YES" in S26), the microcomputer 90 switches the target voltage to 4.1V per secondary battery cell (S27). The microcomputer 90 performs charging while switching the charging target battery pack, and when the voltage of all the battery packs reaches 4.1V per secondary battery cell ("YES" in S29), the microcomputer 90 switches the target voltage to 4.17V per secondary battery cell (S30). The microcomputer 90 performs charging while switching the charging target battery pack, and when the voltage of all the battery packs reaches 4.17V per secondary battery cell ("YES" in S31), the microcomputer 90 performs charging completion display on the state display parts 14a to 14d (S32). The microcomputer 90 detects the temperature of the charging target battery pack (or all the connected battery packs), and when the temperature of the switched battery pack is high (e.g., 50° C. or higher), the microcomputer 90 switches to the battery pack having the next lowest voltage after this battery pack. Then, after the voltage of the battery pack reaches the target voltage, the battery pack skipped due to the high temperature may be charged. However, if the high temperature state continues, another battery pack may be charged, and the charging of this battery pack may be started after the high temperature state is lifted. While FIG. 12 and FIG. 13 show the voltage of each secondary battery cell 72 as the target voltage, stepwise charging may also be performed based on the voltage (overall voltage) of the battery pack. For example, in the case of a battery pack having a rated voltage of 18V, five secondary battery cells are connected in series. Therefore, it suffices to first charge the battery pack to a voltage of 19V (3.8V×5 cells), and then charge it stepwise to 19.75V, 20.5V, and 20.85V. By determining the type or the state of the battery pack each time the charging target battery pack is switched, it is possible to determine whether the same battery pack is connected. In the case where the type of the battery pack is determined only once before the charging of all the connected battery packs is completed, if a different battery pack is replaced in the middle of the charging, the information of the previously connected battery pack will be carried over to this battery pack, and there will be an issue that charging is ended without a full charge. Therefore, in the present embodiment, by always determining the type of the battery pack before starting the charging (whenever there is a switch), it is possible to surely finish the charging.

The microcomputer 90 can derive the remaining capacity ratio of each battery pack from the relationship between the current output voltage of each battery pack and the output voltage when fully charged. By determining the switching of the charging target battery pack based on the remaining capacity ratio, even when a plurality of battery packs having different rated voltages are connected, the charging target battery pack can be appropriately switched. In the first mode, in the case of charging a plurality of battery packs having different remaining capacity ratios, when the remaining capacity ratio of the charging target battery pack is higher than the remaining capacity ratio of at least one other battery pack, the microcomputer 90 switches the charging target battery pack without charging it. When detecting an abnormality (high temperature abnormality, etc.) in the charging target battery pack, the microcomputer 90 switches the charging target battery pack without charging it.

FIG. 14 is a diagram describing the switching condition of the charging target battery pack in each of the first and second modes of the charging device 1. The second mode (normal mode) is a mode in which the battery packs are charged in the order of the port numbers and the charging target battery pack is fully charged before switching to the battery pack of the next port number. In the normal mode, when the charging target battery pack is in a high temperature standby state, this battery pack is skipped and the battery pack of the next port number is charged as the charging target battery pack. When the high temperature standby state is lifted, after the charging of the battery pack being charged is completed, that battery pack is charged as the charging target battery pack. Alternatively, that battery pack may be charged as the charging target battery pack after the charging of all battery packs other than that battery pack is completed. If the battery pack being charged is removed, the battery pack of the next port number may be charged. Further, when a battery pack is connected in the middle of the charging, charging may be performed in the order of the port numbers after the charging of the battery pack being charged is completed. For example, if a battery pack is connected to the port number 2 while the battery pack of the port number 3 is being charged, after the charging of the battery pack of the port number 3 is completed, the newly connected battery pack of the port number 2 is charged. On the other hand, when a battery pack is connected to the port number 4, charging may be performed in the order of the port numbers. In the second mode, the control from the start of charging to the completion of charging of a battery pack is a conventional technique that is generally performed. In other words, the control is as follows: in the case where the battery pack is a lithium battery, charging is started by constant current charging, the charging is switched to constant voltage charging when the voltage of the battery pack (or the voltage of the secondary battery cell) reaches a predetermined value, and when the charging current drops to a predetermined current, taken as a full charge, the charging is stopped. In the first mode (simultaneous charge mode), charging starts from a battery pack having a low voltage (remaining capacity ratio), and the voltages (remaining capacity ratio) of the plurality of battery packs are increased stepwise while kept uniform. When the charging target battery pack is in a high temperature standby state, the battery packs other than this battery pack are sequentially charged in the ascending order of voltage. If some battery packs are removed in the middle of the charging, the remaining battery packs are charged in the ascending order of voltage. When a new battery pack is connected in the middle of the charging, all the battery packs including this battery pack are sequentially charged in the ascending order of voltage. In the first mode, charging may be performed as shown in FIG. 14 even when the connected battery packs have different rated voltages. For example, if there is a battery pack having a low rated voltage, the charging of this battery pack will be completed earlier than other battery packs, and afterwards, in either mode, since it suffices to continue the charging of the battery packs that have not been completely charged, there is no issue even if a plurality of battery packs having different rated voltages are connected. Moreover, since the rated voltage and the remaining capacity ratio (ratio of the remaining capacity to the rated voltage) of the battery pack can be calculated by detecting the type and the state of the battery pack, by charging starting from a battery pack having a low remaining capacity ratio, it is possible to complete the charging substantially at the same time even if the rated voltage is different.

According to the present embodiment, the following operational effects can be obtained.

(1) Since the cooling air generated by the fan 55 is separated by the duct 20 into the first cooling air CA1 flowing through the charging circuit part and the second cooling air CA2 passing through the battery pack connection parts 6a to 6d, the fan 55 can cool the plurality of battery packs connected to the charging device 1 while cooling the charging circuit part. Herein, if the fan 55 is a single fan, as compared with the case of using a plurality of cooling fans, the cost can be reduced and the wiring can be simplified, and meanwhile both the charging circuit part and the plurality of battery packs can be efficiently cooled.

(2) Since the duct 20 is a single member and only needs to be screwed to the upper case 4, it is possible to suppress an increase in the cost, the number of components, and the number of processes required for separating the cooling air generated by the fan 55 into the first cooling air CA1 and the second cooling air CA2. The duct 20 also has a function of guiding dust and water that have entered from the intake port 7 toward the fan 55, and also contributes to dustproofing and waterproofing outside the duct 20 inside the case 3.

(3) Since the intake port 8 for the first cooling air CA1 and the plug outlet 11 are provided on the side part 3e of the case 3 on which the battery pack connection parts 6a to 6d are not provided, and further, the exhaust port 9 and the USB connector 57 are provided on the side part 3f on which the battery pack connection parts 6a to 6d are not provided, the layout efficiency is good.

(4) Since the curvatures of the connection part 25b and the connection part 25c which are located far from the fan 55 are configured to be smaller than the curvatures of the connection part 25a and the connection part 25d which are located close to the fan 55, compared with the case where both curvatures are equal, the amount of the cooling air passing through the intake ports 7 of the battery pack connection parts 6a to 6d can be nearly uniform. Further, since the fan 55 is arranged at the end part of the case 3 off the central part, it is possible to secure the arrangement area of the main board 50.

(5) In the first mode (simultaneous charge mode), by determining the switching of the charging target battery pack based on the remaining capacities of the plurality of battery packs, even when a plurality of battery packs having different rated voltages are connected, the microcomputer 90 can appropriately switch the charging target battery pack. Further, when a battery pack in a high temperature state is connected, other battery packs are charged until the high temperature state is lifted, so that the plurality of battery packs can be efficiently charged.

(6) In the first mode (simultaneous charge mode), since the microcomputer 90 performs charging in the order starting from the battery pack having the lowest remaining capacity, it is possible to perform charging while quickly adjusting the variations in the remaining capacities of the plurality of battery packs.

Embodiment 2

Figure 16:
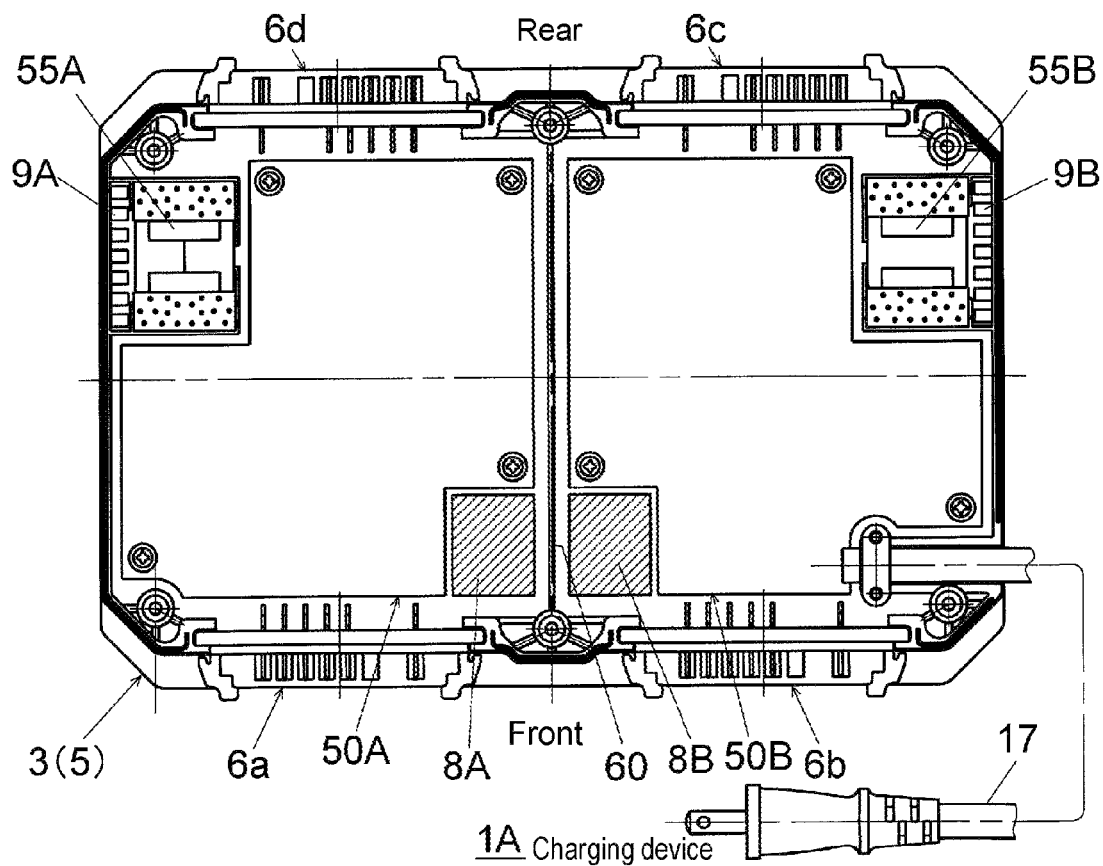
FIG. 16 is a plan sectional view of the charging device 1A.

FIG. 15 is a bottom sectional view of a charging device 1A according to Embodiment 2 of the disclosure. FIG. 16 is a plan sectional view of the charging device 1A. Hereinafter, differences from Embodiment 1 will be mainly described. The charging device 1A has a fan 55A, an intake port (vent) 8A, an exhaust port (vent) 9A, and a main board 50A associated with the battery pack connection parts 6a and 6d, and has a fan 55B, an intake port (vent) 8B, an exhaust port (vent) 9B, and a main board 50B associated with the battery pack connection parts 6b and 6c.

A rib 60 which divides the inside of the case 3 into left and right parts (two substantially equal parts) is provided on the lower case 5. The fan 55A, the intake port 8A, the exhaust port 9A, and the main board 50A are provided on the left side of the rib 60. The fan 55B, the intake port 8B, the exhaust port 9B, and the main board 50B are provided on the right side of the rib 60. The intake port 8A is opened on the lower surface of the right-front part of the left side region of the rib 60 of the case 3. The intake port 8B is opened on the lower surface of the left-front part the right side region of the rib 60 of the case 3. The fan 55A is provided in the lower part of the left-rear part in the case 3. The fan 55B is provided in the lower part of the right-rear part in the case 3. The exhaust port 9A is provided in the lower-rear part of the left side surface of the case 3. The exhaust port 9B is provided in the lower-rear part of the right side surface of the case 3. The main board 50A is fixed to the lower surface of the left side region of the rib 60 of the case 3 by screwing or the like. The main board 50A is mounted with a charging circuit part for charging the battery packs connected to the battery pack connection parts 6*a* and 6*d*. The main board 50B is fixed to the lower surface of the right side region of the rib 60 of the case 3 by screwing or the like. The main board 50B is mounted with a charging circuit part for charging the battery packs connected to the battery pack connection parts 6*b* and 6*c*.

Ducts 20A and 20B serving as guide parts are fixed to the upper case 4 by screwing or the like. The duct 20A forms an air passage between the intake ports of the battery pack connection parts 6*a* and 6*d* and the fan 55A. The duct 20B serving as a guide part forms an air passage between the intake ports of the battery pack connection parts 6*b* and 6*c* and the fan 55B. In the duct 20A, a first air passage end part 21*a* facing the intake port of the battery pack connection part 6*a* is wider than a first air passage end part 21*d* facing the battery pack connection part 6*d*. Further, the curvature of a connection part 25*a* between a first linking part 23*a* and a second linking part 24A is smaller than the curvature of a connection part 25*d* between a first linking part 23*d* and the second linking part 24A. These configurations take into consideration the fact that the first air passage end part 21*a* is farther from the fan 55A than the first air passage end part 21*d*, and are intended to cause the amount of the cooling air passing through the intake ports of the battery pack connection parts 6*a* and 6*d* to be nearly uniform. The duct 20B has a shape symmetrical to the duct 20A.

Other features of the present embodiment are the same as those of Embodiment 1. According to the present embodiment, although two fans 55A and 55B are required, since one fan cools two battery packs and one charging circuit part, compared with the case of cooling one battery pack and one charging circuit part by one fan and the case of cooling two battery packs by one fan, the cost can be reduced and the wiring can be simplified.

While the disclosure has been described above by taking the embodiments as examples, it will be understood by those skilled in the art that various modifications may be made to the component and the processing processes of the embodiments within the scope of the claims. Hereinafter, a modification example will be described.

The number of the battery packs that can be simultaneously connected to the charging device of the disclosure is not limited to four and may be set to any plural number.

What is claimed is:

1. A charging device comprising:
 a plurality of battery pack connection parts;
 a charging circuit charging each of a plurality of battery packs connected to each of the battery pack connection parts;
 a selection means selecting a battery pack connection part to be a charging current supply destination from the charging circuit; and
 a control part controlling the charging circuit and the selection means,
 wherein the control part is capable of alternatively executing a first mode and a second mode as a control mode when the plurality of battery packs are connected to the plurality of battery pack connection parts, wherein the control part selects a battery pack of the plurality of battery packs to be charged as a charging target battery pack,
 in the first mode, before one of the plurality of battery packs as the charging target battery pack being fully charged, the control part switches the charging target battery pack by selecting another one of the plurality of battery packs as the charging target battery pack based on a voltage per a secondary battery cell of the charging target battery pack while the plurality of battery packs are sequentially charged, and
 in the second mode, after the one of the plurality of battery packs as the charging target battery pack being fully charged, the control part switches the charging target battery pack by selecting another one of the plurality of battery packs as the charging target battery pack to charge the plurality of battery packs, and
 the control part detects a type or a state of the charging target battery pack upon each switching.

2. The charging device according to claim 1, wherein the plurality of battery pack connection parts comprises a first battery pack connection part to which a first battery pack is connected, and a second battery pack connection part to which a second battery pack is connected, and
 in the first mode, a charging battery pack is switched while the plurality of battery packs are sequentially charged in the following manner: charging of the first battery pack is started, and before the first battery pack is fully charged, charging of the first battery pack is stopped and charging of the second battery pack is started.

3. The charging device according to claim 1, wherein in the first mode, in a case where the plurality of battery packs having different remaining capacities are charged, the control part switches the charging target battery pack without charging it when the remaining capacity of the charging target battery pack is higher than the remaining capacity of at least one other battery pack.

4. The charging device according to claim 1, wherein in the first mode, the control part derives a remaining capacity of each of the plurality of battery packs based on a relationship between a current output voltage of each of the plurality of battery packs and an output voltage when fully charged, and increases the remaining capacity stepwise while uniforming the remaining capacities of the plurality of battery packs.

5. The charging device according to claim 1, wherein the control part switches the charging target battery pack without charging it when detecting an abnormality of the charging target battery pack.

6. The charging device according to claim 2, wherein in the second mode, the charging battery pack is switched in the following manner: charging of the first battery pack is started, and after the first battery pack is fully charged, charging of the second battery pack is started.

7. The charging device according to claim 6, further comprising a mode switch part for manually switching the control mode of the control part between the first mode and the second mode.

8. The charging device according to claim 6, wherein in the first mode or the second mode, when the first battery pack has a high temperature, the control part starts charging of the second battery pack without charging the first battery pack.

9. The charging device according to claim 8, wherein when a high temperature state of the first battery pack is lifted, the control part starts charging of the first battery pack after charging of the second battery pack.

10. The charging device according to claim 1, wherein even when the plurality of battery packs connected to the battery pack connection parts have different rated voltages, the control part is configured to be able to charge connected ones of the plurality of battery packs.

* * * * *